INVENTOR
THOMAS O. MORRIS
JOHN J. LAWLOR
BY
ATTORNEY

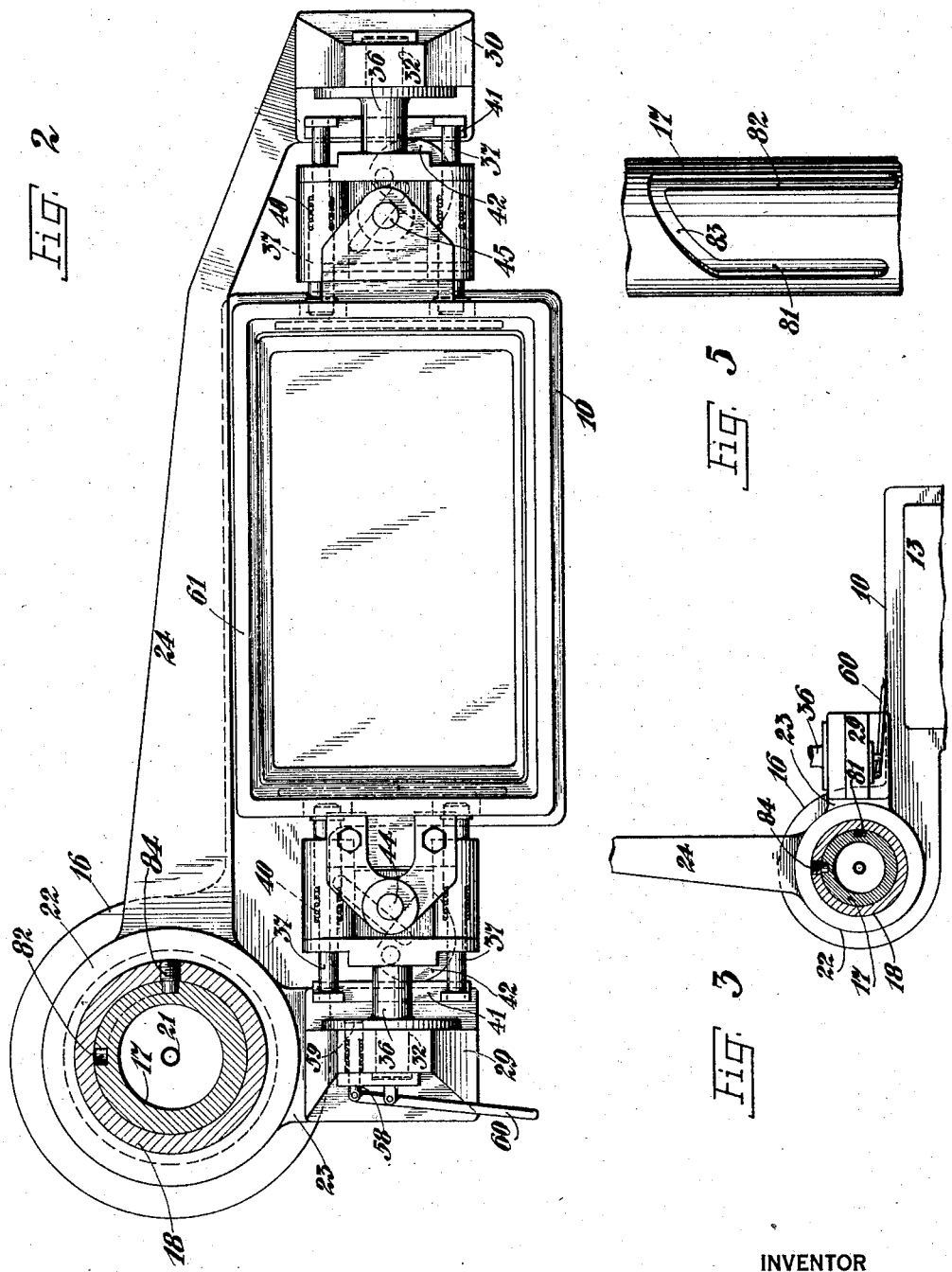

Patented Nov. 25, 1930

1,782,762

UNITED STATES PATENT OFFICE

THOMAS O. MORRIS, OF HARRISBURG, PENNSYLVANIA, AND JOHN J. LAWLOR, OF PLAINFIELD, NEW JERSEY, ASSIGNORS, BY MESNE ASSIGNMENTS, TO AUTOMATIC MOLDING MACHINE CORPORATION, OF DOVER, DELAWARE, A CORPORATION OF DELAWARE

MOLDING MACHINE

Application filed June 1, 1927, Serial No. 195,718. Renewed February 8, 1930.

Our invention relates to molding machines and has for an object to provide improved means for handling flasks and the separate elements thereof.

Another object of our invention is to provide a molding machine of very compact design and simple construction.

Another object of our invention is to provide a machine in which the flask may be quickly attached to and detached from operating parts of the machine.

Another object of our invention is to provide a machine which will accommodate flasks varying considerably in size.

Another object of our invention is to provide improved means for compressing the same in the mold.

Another object of our invention is to provide improved means for stripping the mold after it has been completed.

A more specific object of our invention is to provide a machine with a molding table to support the flask the latter being mounted in trunnion bearings on a vertically movable arm so that the flask may be turned over to permit filling first one side and then the other, the design of the arm being such that even when raised to its highest position it will always lie below the level of the table so that flasks of much greater width than the table may be accommodated thereon.

Another object of our invention is to provide means for automatically locking a ramhead in position over the mold to act as an abutment against which the mold may be compressed.

Another object is to provide a machine in which the flask may be picked up from the table and automatically swung to one side and then lowered upon a suitable support at one side of the machine.

Another object of our invention is to provide a machine embodying the objects above recited in which the principal operations will be performed pneumatically and manual operations will be confined chiefly to the turning of valves and control levers.

With these and other objects in view which will appear hereinafter, our invention consists in certain novel features and constructions and arrangements of parts which will be described in connection with the accompanying drawings illustrating a preferred embodiment of our invention, and will be clearly defined in the appended claims.

Referring to the drawings,

Fig. 2 is a plan view with the ramhead removed and a column on which the ram head is supported cut off along the line 2—2 of Fig. 1.

Fig. 3 is a fragmental view similar to Fig. 2 and showing certain of the parts in a different position;

Fig. 5 is a detail view of the column showing a cam groove found thereon.

Figure 1:
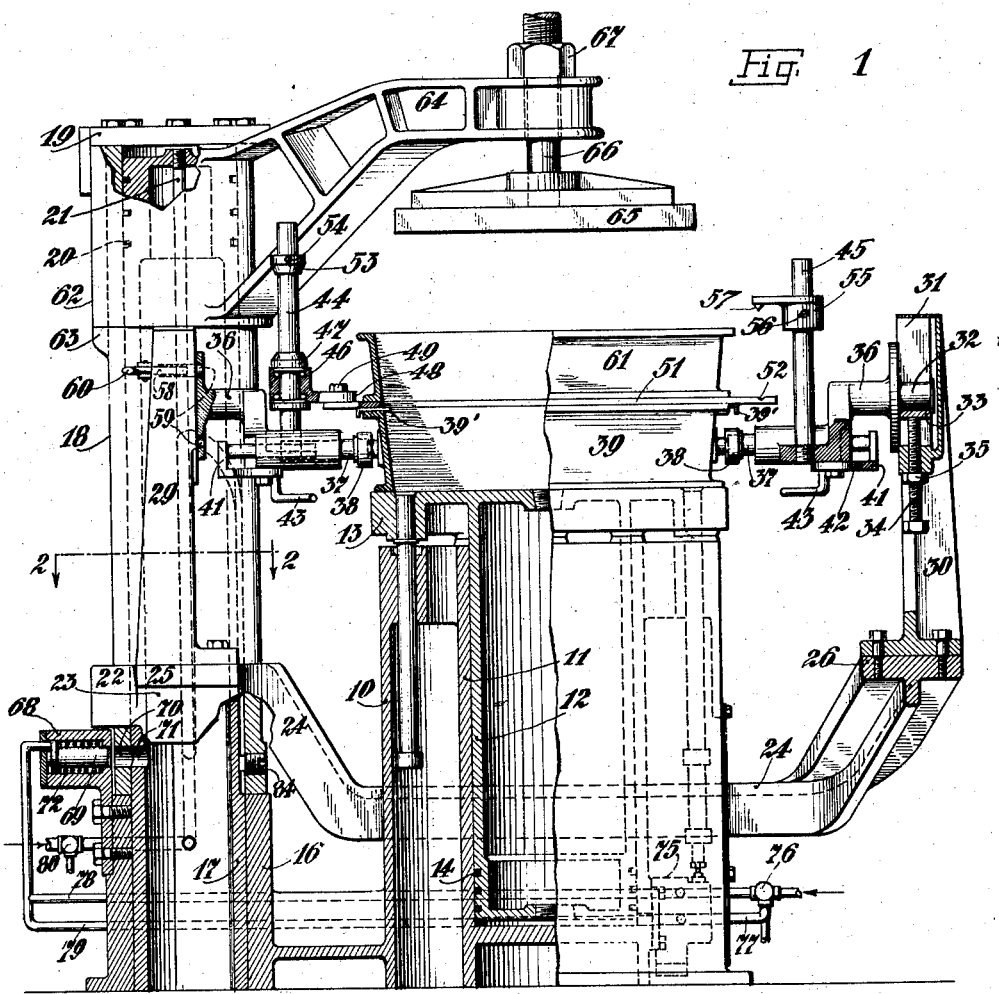
Fig. 1 is a front elevation of our molding machine partly broken away to reveal certain details.
Figure 4:
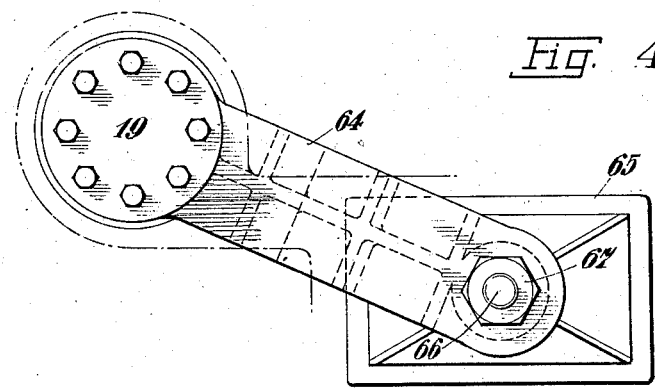
Fig. 4 is a plan view of the ram head and associated parts.

The main body 10 of the base of our machine is formed centrally with a vertical bore providing a cylinder chamber 11 in which is fitted a plunger 12. The plunger is provided at its upper end with a table 13 on which the flask is adapted to be placed. As shown in Fig. 1 the plunger is fitted with packing rings 14 so that when air is introduced into the cylinder 11 under the plunger the table will be raised.

Extending from the main body 10 of the base is a bracket 16 in which is supported and secured a hollow column 17. For the sake of economy of space the center of the column is offset with respect to the table 13 and is preferably located adjacent one corner of the table as indicated in the plan view Fig. 2. Fitted over the column 17 is a sleeve or cylinder 18 which is adapted to slide thereon. The cylinder 18 is provided at its upper end with a cylinder head 19. The column 17 is fitted with piston rings 20 providing air seal between the column and the cylinder. Air under pressure may be introduced through a pipe 21 to the top of the column just under the cylinder head to raise the cylinder on the column. Mounted on the sleeve 18 and rigidly secured thereto is a hub 22 which carries a pair of arms 23 and 24 which are disposed approximately at right angles to each other. The arm 23 is relatively short and provides a support 25 for a pedestal. The other arm 24 which is relatively long curves downward to the rear of the base 10 and then upward and forward, terminating in a support 26 on a level with the support 25 but on the opposite side of the base when the parts are in the position shown in Fig. 1. The downward bend of the arm 24 is such that when the cylinder 18 is raised to the top of its stroke the main body of the arm will lie below the level of the table 13. This permits the use of flasks which are considerably wider than the table because there is no interference with the flasks as the arm 24 moves up and down with the sleeve 18.

Mounted on the supports 25 and 26 respectively are pedestals 29 and 30. Each of these pedestals is formed with a slot 31 at its upper end in which slides a bushing 32. A block 33 slidable in the guideway 31 serves as a support for the bushing and may be adjusted vertically by means of a set screw 34 threaded into the pedestal and locked at the desired adjustment by means of a jam nut 35. The bushings 32 serve as trunnion bearings for a pair of trunnion brackets 36. Each of these brackets is formed with a pair of horizontal bores in which are fitted a pair of plungers 37. These plungers in the opposed brackets 36 serve as jaws between which a flask may be gripped and to this end the cope of each flask is provided with socket members 38 at opposite ends thereof to receive the plungers. The latter are normally urged inward or into engagement with the socket member 38 by means of springs 40. The opposite ends of the plungers 37 are yoked together by a crosshead 41. A cam 42 is mounted to turn on the under face of the trunnion bracket and a handle 43 provides means for turning the cam on its axis. The edge of the cam engages the crosshead 41 and by turning the cam the plungers 37 may be withdrawn against the pressure of springs 40 from engagement with the socket members carried by the flask. The spring pressed plungers provide a self-adjusting means for gripping flasks that vary from one another in size, and the permissible movement of the plungers is sufficient to accommodate a considerable range of sizes. At the same time the cams 42 provide a very simple and quickly operable means for disengaging the plungers from the flask.

Secured to each of the trunnion brackets 36 is a vertical column, that shown at the left of Fig. 1 being indicated by reference numeral 44, and the one at the right by the numeral 45. Fitted for axial movement on the column 44 is a hub 46 fitted with ball bearings 47. An arm 48 projecting from this hub carries a bolt 49 by which attachment may be made to a pattern plate 51. Either the arm or the pattern plate or both may be formed with a slot through which the bolt passes so as to provide for adjustment of position of the plate. The opposite end of the pattern plate is formed with a notch 52 but normally has no connection with the column 45. Secured to the column 44 is a stop member 53 which may be secured at the desired adjustment thereon by any suitable means such as a set screw 54. Similarly the column 45 carries a stop member 55 adjustable thereon and is adapted to be secured at the desired adjustment by means of a set screw 56. The stop member 55 carries a tooth 57 adapted to coact with the notch 52 in the pattern plate as will be explained presently.

It will be understood that the flask is supported by the trunnion brackets 36 when the arms 23 and 24 are raised and to prevent the trunnion brackets from turning in the bushings 32 a spring-pressed pin 58 is provided in the bracket 29, which engages one of a pair of diametrically-opposed notches 59 in the adjacent trunnion bracket member 36. A hand lever 60, as best shown in Fig. 2 may be operated to withdraw the pin from engagement with the notch whenever it is desired to turn the flask over. When the flask is turned over to the reverse of the position shown in Fig. 1 the drag and pattern plate are latched together. On raising the cylinder 18 after such reversal and after unfastening the latching means the drag 61 will rest on the table 13 and the pattern plate 51 will rest on the drag while the cope is being lifted up until the stop 53 engages the ball bearing member 47 and the tooth 57 engages the notch 52, whereupon further lifting movement of the arms 24 and 25 will then lift the pattern plate clear of the drag so that the pattern plate may be swung out of the way about the column 44 as an axis. To hold the sand in the cope when it is lifted off the drag retainer plates 39' are provided on the cope. These retainer plates have pin and slot engagement with cope and in operative position project inwardly to engage the mold, but when it is desired to strip the cope off the mold the plates are withdrawn.

Mounted on the upper end of the sleeve 18 and free to turn thereon is a hub 62 which fits between the cylinder head 19 and a shoulder 63 formed on the sleeve. The hub 62 is formed with an arm 64 which carries the ramhead 65. The ramhead is mounted on the lower end of a stem 66 which is threaded into an opening in the outer end of the arm 64, and a jam nut 67 serves to lock the ramhead at the desired adjustment.

When the sand in the flask is to be compressed against the ramhead 65 it is essential that the latter be held against vertical movement and to this end a locking device is provided for locking the sleeve 18 to the column 17. Mounted on the bracket 16 is a small cylinder block 68 in which is fitted a plunger 69. The plunger is adapted to pass through a pair of alined openings 70 and 71 located respectively in the sleeve 18 and column 17. A spring 72 normally holds the plunger in retracted position. But on introducing air under pressure into the cylinder block 68 back of the plunger 69 the latter will be forced against the pressure of the spring 72 into operative engagement with the openings 70 and 71 thus locking the sleeve 18 against vertical movement.

The table 13 may be given either a rapid reciprocating motion or it may be pressed steadily upward by pneumatic pressure. An automatic valve mechanism for producing the reciprocating movement is indicated at 75 in Fig. 1. This valve may be of any suitable type to alternately charge air into and discharge air from the cylinder 11. A control valve 76 provides means for introducing air under pressure from a suitable source into the cylinder 11 either directly through a pipe 77 or by way of an automatic valve 75. In the normal position of the valve 76 the cylinder 11 is connected with exhaust and the table 13 remains at its lowermost position. When the valve 76 is operated to actuate the table 13 either continuously or intermittently, air is at the same time fed through pipes 78 and 79 to the cylinder 68, so that whenever the table is lifted the cylinder 18 is locked against movement by the plunger 69 and the head 65 is held in fixed position to serve as an abutment. To raise and lower the cylinder 18 we provide a control valve 80 which in one position feeds air under pressure through the pipe 21 and in normal position connects the pipe 21 to exhaust.

The operation of our machine so far described is as follows: A flask with its pattern plate in position is placed on the table 13 with the cope at the bottom and the drag at the top as shown in Fig. 1. The pattern plate is bolted fast to the hub 48. The drag is then filled with sand and a suitable mold plate or board (not shown) is placed over the top of the flask on the drag. The ramhead 65 is now swung around in position over the flask and the valve 76 is operated first to reciprocate the table 13, thereby jarring the sand compactly around the pattern, and then to force the table 13 upward and press the flask against the ramhead 65. The elements of the flask are then latched together by a suitable means (not shown) so that the mold board and the drag will be secured to the cope. The ramhead 65 is now swung out of the way and the valve 80 is operated to raise the cylinder 18 and thus lift a flask clear of the table 13. The hand lever 60 is operated to withdraw the pin 58 permitting the flask to be turned over with the cope uppermost and in the latter position the pin 58 engages the opposite notch 59 holding the flask against turning. The valve 80 is now operated to lower the flask on the table 13 and thereafter sand is filled into the cope about the pattern. Before filling the cope the retainer plates 39' are moved inward to lap over the lip of the cope. After the cope has been filled the ramhead 65 is again swung into position and the valve 76 is operated as before, first to jar the sand and then to compress the sand by raising the table 13 with the flask against the ramhead 65.

This completes the forming of the mold and it is now necessary to strip the mold of the flask and pattern members. To this end the elements of the flask are unlatched and the valve 80 is now operated to raise the trunnion brackets 36. It will be recalled that the flask has been inverted with respect to the position shown in Fig. 1; in other words the drag is resting on the table 13. As the trunnion brackets are lifted the cope is first raised off the pattern plate and drag, and then, when the bearing member 47 engages the stop 53, and the notch 52 in the pattern plate engages the tooth 58, the pattern will be lifted out of the drag. The lifting operation is continued until the pattern carried by the pattern plate clears the drag as well as the cope. The pattern plate may then be swung about the column 45 as an axis to clear the flask, and the valve 80 may be operated to lower the cope upon the drag. The retainer plates 39' are now withdrawn into the lip of the cope so that on the next lifting operation the cope will be stripped off the mold. Thereafter the drag member of the flask may be removed by hand leaving the completed mold resting on the mold plate or board which is supported on the table 13. If desired the cope and drag members may be latched together and stripped simultaneously off the mold. The mold may now be removed by any suitable means leaving the machine clear for the preparation of the next mold.

For certain purposes it is desirable to have the arms 23 and 24 swing to one side of the machine either to pick up a flask or a part of a flask or to deposit the flask. For this reason we form the column 17 with a cam groove such as shown in Fig. 5. This cam groove comprises a pair of vertical portions 81 and 82 which are connected at the top by a spiral portion 83. A pin or roller 84 carried by the cylinder 18 is adapted to engage this groove. In the normal operation of the machine, when it is desired to lift the flask off the table or to remove the pattern plate from the mold, the cylinder 18 is pneumatically raised with the pin 84 engaging the vertical part 81 of the cam groove. This serves to guide the cylinder as it moves up and down and prevent it from turning laterally. When, however, it is desired to swing the cylinder 18 around, the valve 80 is operated to continue the lifting until the pin 84 engages the spiral portion 83 of the cam groove which will cause the cylinder to swing through an angle of 90 degrees; then on exhausting the air from the cylinder 18, the pin 84 will travel down the vertical portion 82 of the cam groove, thus bringing the trunnion brackets 36 into convenient position to pick up another flask or to deliver a load. It will be evident that the sleeve will be returned to the position shown in Fig. 1 on the next complete reciprocation of the cylinder 18, it being merely necessary to swing the arm 24 slightly when the cylinder has reached the top of its stroke so that the pin 84 will pass out of the portion 82 of the cam groove and enter the spiral portion 81.

Instead of having the ram head fixed in the arm 64 it may merely be suspended therefrom, i. e. the stem 66 need not be threaded into the arm 64, so that when the flask is reciprocated against the ramhead a pounding or ramming action will result which will aid materially in properly compacting the sand.

We wish it to be understood that while we have described in considerable detail a preferred embodiment of our invention we do not limit ourselves to the specific construction shown, but consider ourselves at liberty to make such variations, alterations, and modifications of construction and arrangements of parts as fall within the spirit and scope of the following claims.

We claim:

1. In a molding machine, a table, a frame adjacent the table and having an arm at one end of the table and a second arm extending back of and to the opposite end of the table, trunnion jaws carried by said arms above the level of the table, and means for raising and lowering the frame, said second arm being downwardly offset intermediate its ends so as not to rise above the level of the table when the frame is raised.

2. In a molding machine, a table, a frame movable vertically with respect to the table, trunnion members journalled in the frame on opposite sides of the table, jaws carried by the trunnion members and adapted to engage a flask, and means for raising the frame to lift the flask clear of the table whereby the flask may be inverted.

3. In a molding machine, a table, a frame movable vertically with respect to the table, trunnion members journalled in the frame on opposite sides of the table, jaws carried by the trunnion members and adapted to engage a flask, means for raising the frame to lift the flask clear of the table so that the flask may be inverted, and a latch for locking the trunnion members against turning.

4. In a molding machine, a vertically movable frame, trunnion members journalled in the frame, opposed spring-pressed jaws carried by the trunnion members respectively, and means for opening said jaws against spring pressure.

5. In a molding machine, a vertically movable frame, trunnion members journalled in the frame, opposed jaws carried by the trunnion members and adapted to engage opposite sides of a flask, the jaws being automatically adjustable to engage flasks of different sizes.

6. In a molding machine, a vertically movable frame, trunnion members journalled in the frame, opposed spring-pressed jaws carried by the trunnion members respectively, and a cam lever on each trunnion member operable to withdraw the jaw carried thereby.

7. In a molding machine, a vertically movable frame, opposed trunnion brackets journalled therein, pins slidable in the brackets and adapted to engage opposite sides of the flask, springs urging the pins into engaging position, and cam mechanism for withdrawing the pins.

8. In a molding machine, a vertically movable frame, opposed trunnion brackets journalled therein, pins slidable in the brackets, a flask, socket members carried by the flask on opposite sides thereof, springs urging the pins of the opposed brackets into engagement with the socket members respectively, and a cam mechanism for withdrawing the pins.

9. In a molding machine, a table, a frame vertically movable adjacent the table, opposed jaws journalled in the frame and adapted to engage a flask, means for moving the frame angularly to support the flask in operative relation to the table, and means for raising the frame to clear the table and permit the flask to be inverted.

10. In a molding machine, a table, a vertically movable cylinder, a fixed vertical column fitted within the cylinder and serving as a plunger therefor, means for charging air into and discharging air from the cylinder to effect vertical movement thereof, pin and cam groove connection between the cylinder and the plunger adapted to cause angular movement of the cylinder near the top of its stroke and means supported by the cylinder for carrying a flask toward and from operative position with respect to the table.

11. In a molding machine, a table, a vertically movable cylinder, a fixed vertical column fitted within the cylinder and serving as a plunger therefor, means for charging air into and discharging air from the cylinder to raise and lower the cylinder, the column being formed with a cam groove comprising two angularly spaced vertical portions and an inclined portion connecting said vertical portions at the top, a pin carried by the cylinder and engaging the cam groove, and means carried by the cylinder for engaging a flask and carrying the flask toward and from operative position with respect to the table.

12. In a molding machine, a table adapted to support a flask comprising a cope and drag and a pattern plate therebetween, a frame movable vertically with respect to the table, trunnion members journalled in the frame, opposed jaws carried by the trunnion members and adapted to engage the cope, a stud carried by each trunnion member, a stop adjustable on each stud, and means for raising the frame whereby the cope will be raised by said jaws and the pattern plate will be raised by said stops in spaced relation to the cope and the drag.

13. In a molding machine, a table adapted to support a flask comprising a cope and drag and a pattern plate therebetween, a frame movable vertically with respect to the table, trunnion members journalled in the frame, opposed jaws carried by the trunnion members and adapted to engage the cope, a stud on one of the trunnion members, an arm rotatable and slidable on the stud, a stop for limiting sliding movement of the arm, means for securing said pattern plate to the arm, and means for raising the frame whereby the cope will be lifted by said jaws and the pattern plate will be raised to an intermediate position by coaction of the stop with the arm, permitting the pattern plate to be swung clear of the cope and the drag.

14. In a molding machine, a vertically movable table adapted to support a flask, trunnion jaws adapted to engage the flask, a vertically movable member carrying the jaws, pneumatically actuated means for raising said member to permit of inverting the flask, a ramhead carried by said member, pneumatic means for raising the table to compress the contents of the flask against the ramhead, and means automatically locking said member against vertical movement when the table is raised.

15. In a molding machine, a vertically movable table adapted to support a flask, trunnion jaws adapted to engage the flask, a vertically movable member carrying the jaws, pneumatically actuated means for raising said member to permit of inverting the flask, a ramhead carried by said member, locking means for locking said member against vertical movement, and means for simultaneously actuating said locking means and raising the table to compress the contents of the flask against the ramhead.

THOMAS O. MORRIS.
JOHN J. LAWLOR.